(12) United States Patent
Fairhurst et al.

(10) Patent No.: US 7,673,172 B2
(45) Date of Patent: *Mar. 2, 2010

(54) METHOD, SYSTEM, AND PROGRAM FOR ERROR HANDLING IN A DUAL ADAPTOR SYSTEM WHERE ONE ADAPTOR IS A MASTER

(75) Inventors: Matthew John Fairhurst, Hampshire (GB); Michael John Jones, Hants (GB); Vernon J. Legvold, Tucson, AZ (US); Michael P. Vageline, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/960,505

(22) Filed: Dec. 19, 2007

(65) Prior Publication Data
US 2008/0098259 A1 Apr. 24, 2008

Related U.S. Application Data

(63) Continuation of application No. 11/158,755, filed on Jun. 22, 2005, now Pat. No. 7,386,760, which is a continuation of application No. 09/998,463, filed on Nov. 29, 2001, now Pat. No. 6,983,397.

(51) Int. Cl.
*G06F 11/00* (2006.01)
(52) U.S. Cl. .......................................... 714/9; 714/13
(58) Field of Classification Search ................ None
See application file for complete search history.

(56) References Cited

U.S. PATENT DOCUMENTS

| 5,390,326 | A | * | 2/1995 | Shah .......................... 370/222 |
| 5,926,619 | A | * | 7/1999 | Badovinatz et al. ............. 714/4 |
| 5,978,939 | A | * | 11/1999 | Mizoguchi et al. ............ 714/55 |
| 6,012,154 | A | * | 1/2000 | Poisner ........................ 714/55 |

(Continued)

OTHER PUBLICATIONS

U.S. Patent Application entitled "System and Program for Error Handling in a Dual Adaptor System Where One Adaptor is a Master", U.S. Appl. No. 12/350,821, filed Jan. 8, 2009, by inventors M.J. Fairhurst, M.J. Jones, V.J. Legvold, and M.P. Vageline.

*Primary Examiner*—Gabriel L Chu
(74) *Attorney, Agent, or Firm*—Rabindranath Dutta; Konrad Raynes & Victor LLP

(57) ABSTRACT

Provided is a method, system, and program for processing Input/Output (I/O) requests to a storage network including at least one storage device and at least two adaptors, wherein each adaptor is capable of communicating I/O requests to the at least one storage device. An error is detected in a system including a first adaptor, wherein the first adaptor is capable of communicating on the network after the error is detected. In response to detecting the error, a master switch timer is started that is less than a system timeout period if the first adaptor is the master. An error recovery procedure in the system including the first adaptor would be initiated after the system timeout period has expired. An operation is initiated to designate another adaptor in the storage network as the master if the first adaptor is the master in response to detecting an expiration of the master switch timer.

11 Claims, 5 Drawing Sheets

U.S. PATENT DOCUMENTS

| | | | |
|---|---|---|---|
| 6,147,967 A * | 11/2000 | Ying et al. | 370/222 |
| 6,618,825 B1 * | 9/2003 | Shaw | 714/55 |
| 6,625,747 B1 * | 9/2003 | Tawil et al. | 714/6 |
| 6,889,338 B2 * | 5/2005 | Srinivasan et al. | 714/4 |
| 6,944,785 B2 * | 9/2005 | Gadir et al. | 714/4 |
| 6,954,884 B2 * | 10/2005 | Dean et al. | 714/51 |
| 7,043,663 B1 * | 5/2006 | Pittelkow et al. | 714/4 |
| 7,222,268 B2 * | 5/2007 | Zaifman et al. | 714/47 |
| 7,337,355 B2 | 2/2008 | Fairhurst et al. | |
| 2002/0023151 A1 * | 2/2002 | Iwatani | 709/223 |
| 2008/0052557 A1 | 2/2008 | Fairhurst et al. | |
| 2008/0098258 A1 | 4/2008 | Fairhurst et al. | |

* cited by examiner

METHOD, SYSTEM, AND PROGRAM FOR ERROR HANDLING IN A DUAL ADAPTOR SYSTEM WHERE ONE ADAPTOR IS A MASTER

CROSS-REFERENCE TO RELATED APPLICATIONS

This application is a continuation of application Ser. No. 11/158,755, filed on Jun. 22, 2005, which is incorporated herein by reference in its entirety.

Application Ser. No. 11/158,755, is a continuation of application Ser. No. 09/998,463 filed on Nov. 29, 2001, which is also incorporated herein by reference in its entirety.

BACKGROUND OF THE INVENTION

1. Field of the Invention

The present invention relates to a system, method, and program for error handling in a dual adaptor system.

2. Description of the Related Art

In a storage loop architecture, such as the Serial Storage Architecture (SSA), a plurality of disks are interconnected to one or more adaptors so that either of the adaptors can access the one or more loops of interconnected disks. An adaptor may include two or more ports to allow connection to one or more loops. For each loop on which the adaptor communicates, one adaptor port connects to a first disk in the loop and the other port connects to another disk in the loop. Additional adaptors may be added to the loop, such that one port on each other adaptor connects to one disk and another port connects to another disk so that the additional adaptors are placed within the loop. Additional details of the SSA architecture and different possible loop topologies are described in the International Business Machines Corporation (IBM) publication "Understanding SSA Subsystems in Your Environment", IBM document no. SG24-5750-00 (April, 2000), which publication is incorporated herein by reference in its entirety.

One or more computer systems, such as storage subsystems, host system, etc., may include the adaptors connecting to the loop. Adaptors that share a loop must intercommunicate to coordinate accesses to disks in the shared loop. High end storage systems, such as the IBM Enterprise Storage Server (ESS), can detect errors in the ability of an adaptor in another system to communicate with the local operating system even though such detected adaptor is still capable of communicating on the network. In such instances, the system detecting the problem will delay I/O processing for a timeout period that corresponds to the time required for the other system including the adaptor to initiate an error recovery procedure. This timeout period must take into account all different timeout periods and error recovery procedures that could occur within the detected system unable to communicate with the adaptor. In many cases the timeout period can extend for several minutes.

In storage systems requiring high availability, such as storage systems for critical uses, any delays in I/O processing are generally unacceptable. Thus, extensive delays in I/O processing, such as a delay resulting from the lengthy timeout period for the error recovery process at the detected system, would be unacceptable in a high availability system.

In addition to delays that may result from having to wait for the system housing the other adaptor to reset, additional delays may be incurred when a master adaptor is subject to the reset. The master adaptor, which is the configurator with the highest unique identifier (ID), is responsible for configuring each port in the network with various parameters and coordinating the processing of asynchronous events such as dynamic changes in the network configuration. If a master adaptor is reset, then in the SSA architecture, the adaptor having the next highest unique identifier will be designated as the master. Following reassignment of the master node, each remaining adapter on the loop adjusts internal routing algorithms under direction from the new master initiator, so that frames are automatically rerouted to avoid the break. This allows devices to be removed or added to the loop while the subsystem continues to operate without interruption.

Upon resetting an adaptor, the system will experience a brief I/O delay to coordinate the reset adaptor entering a disabled state. If a slave is reset, then the I/O delay may only be a few seconds. However, if the master is reset, then the I/O delay may double to 8 to 16 seconds due to the additional time needed to switch the master to another adaptor.

For these reasons there is a need in the art to provide improved error handling that reduces timeout delays in systems where two adaptors are capable of accessing the storage devices and reduces delays associated with resetting the master adaptor.

SUMMARY OF THE PREFERRED EMBODIMENTS

Provided is a method, system, and program for processing Input/Output (I/O) requests to a storage network including at least one storage device and at least two adaptors, wherein each adaptor is capable of communicating I/O requests to the at least one storage device. An error is detected in a system including a first adaptor, wherein the first adaptor is capable of communicating on the network after the error is detected. In response to detecting the error, a master switch timer is started that is less than a system timeout period if the first adaptor is the master. An error recovery procedure in the system including the first adaptor would be initiated after the system timeout period has expired. An operation is initiated to designate another adaptor in the storage network as the master if the first adaptor is the master in response to detecting an expiration of the master switch timer.

In further implementations, a reset request is sent to the first adaptor after the master switch timer expires.

In still further implementations, in response to detecting the error, a monitoring state is initiated to monitor I/O requests transmitted through a second adaptor. In response to receiving an I/O request, an I/O delay timer is started that is less than the system timeout period. A reset request is sent to the first adaptor in response to detecting an expiration of one started I/O delay timer.

Yet further, the steps of initiating a monitoring state, starting the I/O delay timer and sending the reset request may be performed by a device driver executing in an operating system.

The described implementations provide improved error handling techniques when detecting a problem with the ability of another adaptor to communicate to the system in which the adaptor is housed. The described error handling techniques reduce delays in I/O processing when detecting errors in the ability of other adaptors to communicate to the system in which they are housed.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
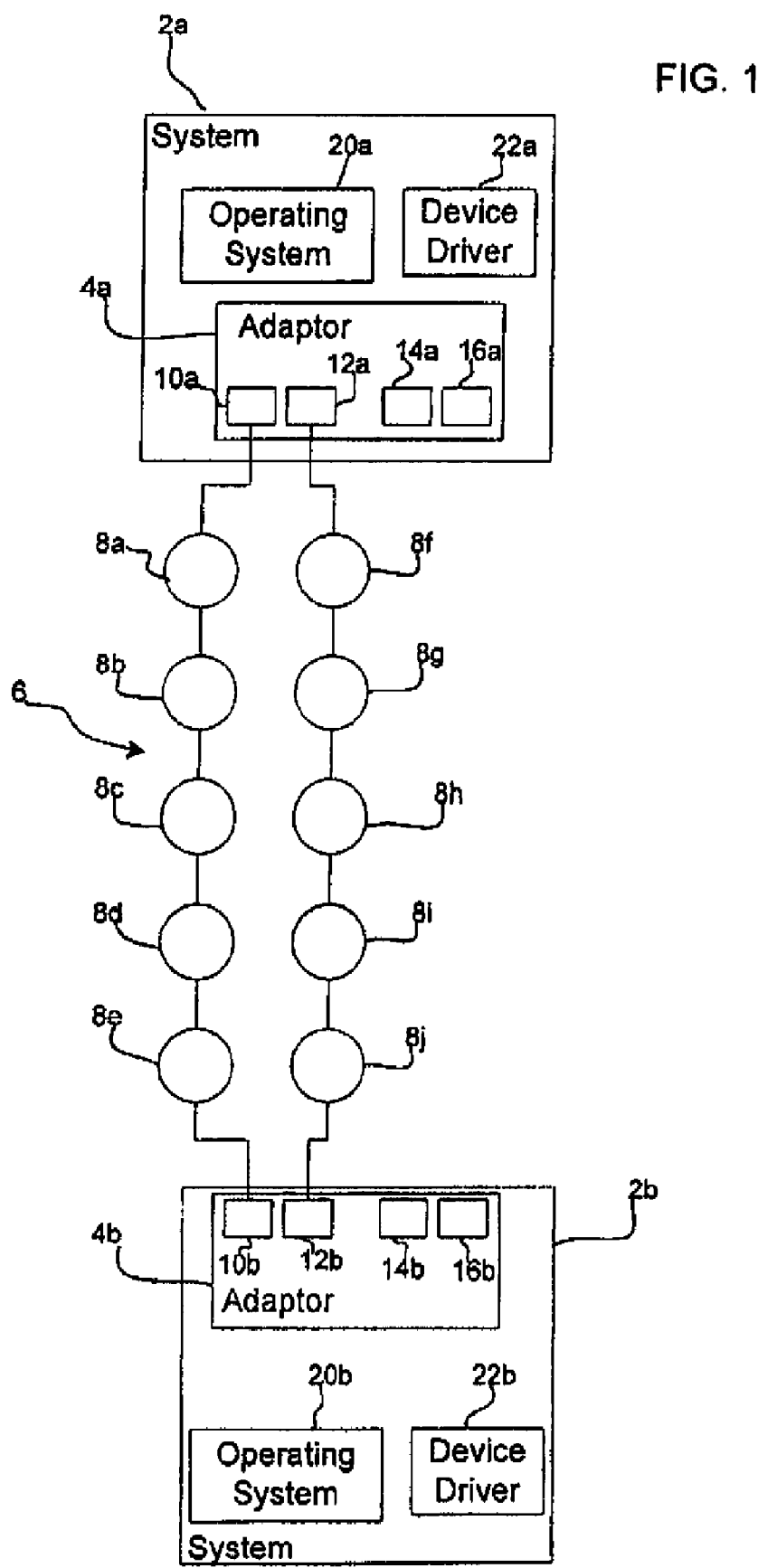
FIG. 1 illustrates a computing environment in which aspects of the invention are implemented.

FIG. 1 illustrates a computing environment in which aspects of the invention are implemented. Computer systems 2a and 2b include at least one adaptor 4a and 4b to enable communication with a loop 6 of interconnected storage devices 8a, 8b . . . 8j, such as hard disk drives, tape drives, optical disk drives, etc. Each adaptor 4a and 4b includes a plurality of ports 10a, 12a, 14a, 16a and 10b, 12b, 14b, and 16b, respectively. In FIG. 1, ports 10a, 10b, 12a, and 12b are shown as connected to the loop 6. The other ports 14a, 14b, 16a, and 16b may connect to additional loops. Further, FIG. 1 provides an example loop configuration. Those skilled in the art will appreciate that there are numerous loop configurations that may be implemented between one or more adaptors.

The systems 2a and 2b may comprise any computing device known in the art, such as a host system, storage subsystem, workstation, server, etc. Each system 2a and 2b includes an operating system 20a and 20b, respectively, and device drivers 22a and 22b that enable communication between the operating systems 20a, 20b and the adaptors 4a, 4b. Each of the storage devices 8a, 8b . . . 8j would also include ports (not shown) to connect to the loop 6. In certain implementations, the loop 6 may be implemented using the Storage Serial Architecture (SSA) or any other protocol enabling multiple hosts to communicate with multiple storage device, such as Fibre Channel, Ethernet, Gigabyte Ethernet, Infiniband, etc. The loop 6 may be part of a Storage Area Network (SAN), Wide Area Network (WAN), Local Area Network (LAN), the Internet, an Intranet, etc.

Figure 2:
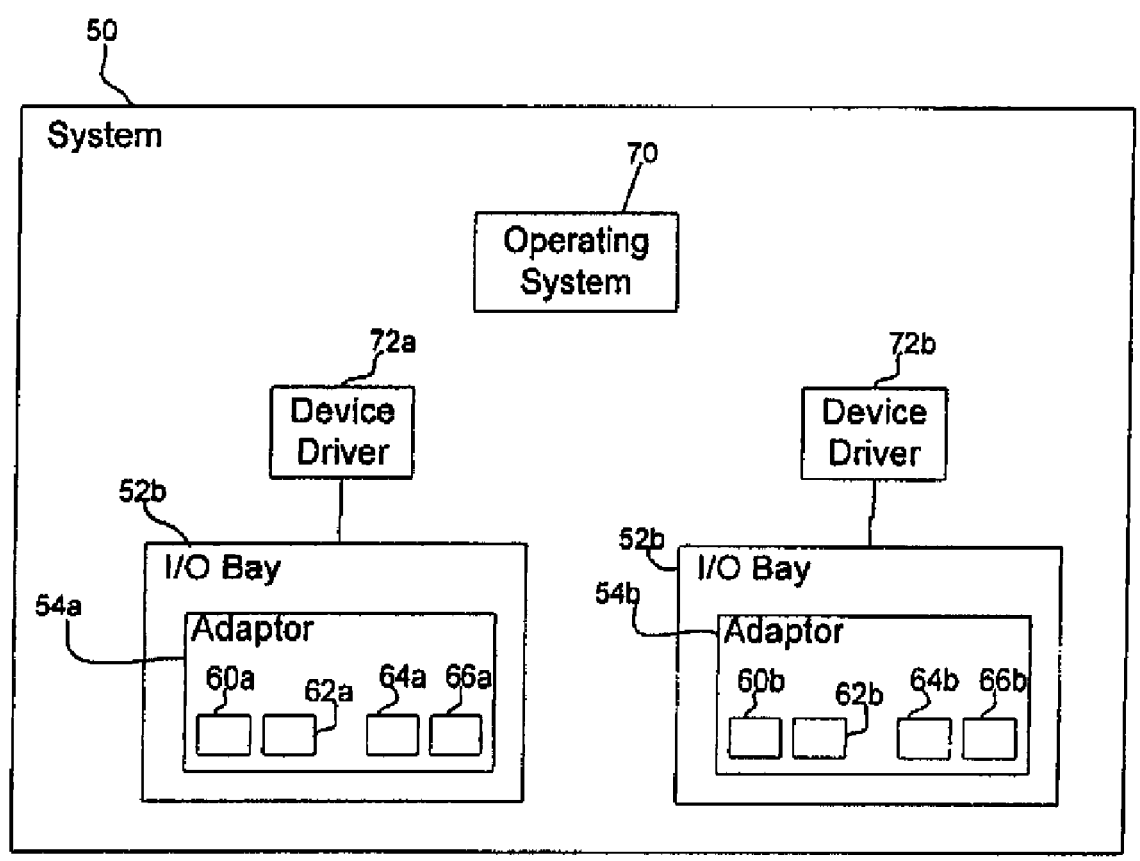
FIG. 2 illustrates an alternative computing environment in which aspects of the invention are also implemented.

FIG. 2 illustrates an alternative implementation where the adaptors 54a and 54b are housed in different Input/Output bays 52a and 52b within the same system 50. Each I/O bay 52a and 52b provides a separate power boundary. Thus, adaptors 54a and 54b are on separate power boundaries. Each adaptor 54a and 54b includes ports 60a, 62a, 64a, 66a and 60b, 62b, 64b, and 66b, respectively, for communication with one or more loops (not shown) according to any loop topology known in the art. In the implementation of FIG. 2, the system 50 includes one operating system 70 and separate device drivers 72a and 72b to manage the operations of adaptors 54a and 54b. Alternatively, only one instance of the device driver may execute to manage the operations of both the adaptors 54a and 54b. Each I/O bay 52a and 52b provides different communication channels and power sources for the adaptors 54a and 54b, respectively.

Figure 3:
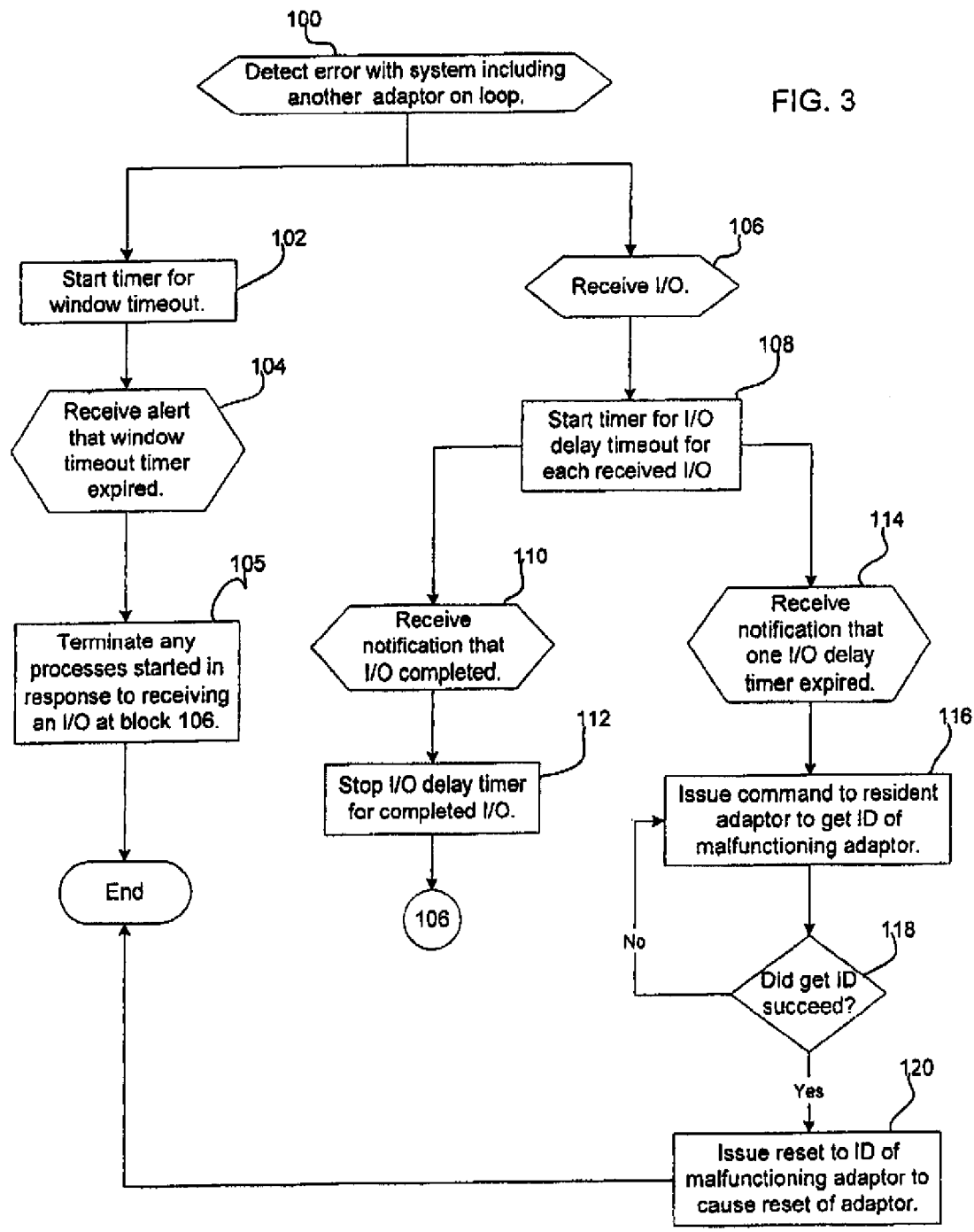
FIG. 3 illustrates logic implemented when detecting a problem in the system housing another adaptor in accordance with implementations of the invention.

FIG. 3 illustrates logic implemented in the device drivers 22a and 22b (FIG. 1), as well as device drivers 72a and 72b (FIG. 2) to handle a situation where an error is detected in the system housing the other target adaptor 4b. For instance, the target adaptor 4b may be unable to communicate with the operating system 20b due to a problem in the bus interfacing between the adaptor 4b and the system 2b in which the operating system 20b is executing. For instance, the adaptor 4b may be implemented on a Peripheral Component Interconnect (PCI) card and the PCI bus between the system 2b and adaptor 4b may be malfunctioning. In such cases, the target adaptor 4b itself is operational, but does not fully function because of another problem in the system 2b housing the target adaptor 4b.

The error handling process of FIG. 3 begins at block 100 where the device driver in one adaptor, e.g., device driver 22a in adaptor 4a, detects an error within the system 2b including the target adaptor 4b, even though no error was detected at the target adaptor 4b. In such case, the source adaptor 4a would be able to continue processing I/Os against the storage devices 8a, 8b . . . 8j because the target adaptor 4b is available on the loop 6. In response to detecting the error, the device driver 22a begins two concurrent (or non-concurrent) processes at blocks 102 and 106. At block 102, the device driver 22a starts a window timeout timer 102. In certain implementations, the duration of the window timeout timer coincides with a time during which the system 2b including the target adaptor 4b is guaranteed to have completed an error recovery procedure. This window timeout timer includes the time that would pass before the other system 2b would initiate the error recovery procedure after detecting a problem. The error recovery procedure initiated by the system 2b would likely eliminate the detected error. Upon the system 2b beginning the error recovery procedure by resetting or undergoing a power cycle, the target adaptor 4b would go offline and not participate in the loop 6. In certain implementations, each adaptor 4a, 4b on the loop is aware of all active adaptors. Once an adaptor becomes unavailable or unable to communicate on the loop 6, then the adaptors remaining on the loop are notified of such state change and remove the unavailable adaptor from loop registries (not shown) each adaptor maintains that indicates available adaptors on the loop. The capability of one system to detect errors in other systems, such as problems a remote system may have in communicating with internal adaptors is known in the art of high availability storage subsystems, such as the IBM Enterprise Storage Servers (ESS).** Thus, if the device driver 22a, 22b takes no action for the window timeout period, the device driver 22a, 22b can be assured that the other system 2b will have reset and the communication problem with the target adaptor 4b will have been repaired or taken off-line. Thus, after an alert is received (at block 104) that the windows timeout timer expired, the monitoring ends and any processes or timers started in response to receiving an I/O request at block 104 are terminated (at block 105) because the communication problem in the system 2b including the target adaptor 4b is in the process of being repaired. During the system 2b error recovery procedure, the target adaptor 4b would go off-line and not affect loop operations.

IBM and Enterprise Storage Server are trademarks of International Business Machines Corporation.

At block 106, upon receiving an Input/Output (I/O) request, the device driver 22a starts (at block 108) an I/O delay timer for the received I/O request and forwards the I/O request to the adaptor 4a to execute against the target storage device 8a, 8b . . . 8j. In certain implementations, the I/O delay timer reflects a maximum tolerable I/O delay dependent on the environment in which the storage system is deployed. Thus, the I/O delay timer in high availability systems is relatively shorter than systems requiring less availability. For instance, in high availability systems, the windows timeout period may run for several minutes to ensure the initiation of the error recovery process at the remote system 2b and the I/O delay period may be only a couple of seconds. Upon receiving (at block 110) notification that the monitored I/O request completed, the device driver 22a would stop (at block 112) the I/O delay timer that was started for the completed I/O request and control returns to block 106 to await any further received I/O requests or one of the other events at blocks 104 and 114. Upon receiving (at block 114) notification that one I/O delay timer expired, the device driver 22a issues (at block 116) a command to the local adaptor 4a to get the identifier (ID) of the target adaptor 4b. As mentioned, in certain implementations, the local adaptor 4a could access the target adaptor 4b from a loop registry. If there is no ID for the target adaptor 4b in the loop registry, then that target adaptor 4b is not available on the loop. However, the unavailable target adaptor 4b may still affect I/O operations of the source adaptor 4a, such as by preventing the loop 6 from completing a configuration. The target adaptor 4b may be only temporarily unavailable. If (at block 118) the get ID operation succeeded, i.e., the ID of the target adaptor 4b is included in the loop registry, then the device driver 22a issues (at block 120) a reset request to the received ID of the target adaptor 4b to cause a reset of the target adaptor 4b. Otherwise, if (at block 118) the get ID request did not succeed, then the device driver 22a returns to block 116 to issue additional get ID requests until the ID is received or the window timeout timer expires at block 104. The device driver 22a may be unable to obtain the ID if the system 2b including the target adaptor 4b, or the I/O bays 52a and 52b in the case of FIG. 2, is in the process of being reset.

In alternative implementations, the source adaptor 4a may query the target adaptor 4b over the loop 6 for the adaptor 4b ID. With the logic of FIG. 3, if the target adaptor 4b becomes available after one or more get ID requests fail at block 118 and before the windows timeout timer expires at block 104, then the device driver 22a would send the reset command to the adaptor 4b to cause the adaptor 4b to reset. If, during the reset operation, the target adaptor 4b is unable to establish communication with the system 2b, then the target adaptor 4b would not come back online and would not be available on the loop 6 until after the system 2b resets or power cycles and corrects the communication problem with the target adaptor 4b. If the target adaptor 4b becomes unavailable as a result of the reset, then the source adaptor 4a and any other adaptors on the loop 6 can continue operating on the loop 6 without concern that the problems at the off-line target adaptor 4b will cause problems.

In the described implementations, the device drivers 22a and 22b communicate an adaptor reset command. In alternative implementations, a system reset or power cycle command may be communicated. In implementations such as FIG. 2 where the two adaptors are housed in the same system, then a problem may occur at the I/O bay 52a and 52b level including the adaptor, such that the adaptor, e.g., adaptor 54b, cannot communicate with the system even though the adaptor 54b can communicate on the loop. In such case, the device driver 72a detecting the problem in the I/O bay in the same system 50 may perform the reset with respect to the specific I/O bay 52b where the error is detected to avoid resetting or rebooting the entire system 50.

With the logic of FIG. 3, the device drivers 22a, 22b upon detecting errors at another peer adaptor will begin monitoring I/O requests to determine if any unacceptable I/O delays have occurred, i.e., I/O delays that extend the duration of the I/O delay timer. If no such unacceptable I/O delays occur, then the device drivers 22a, 22b would continue performing I/Os and the system 2a, 2b housing the target adaptor would eventually reset without affecting I/O processing at the other adaptor 4a, 4b. However, if an I/O request is delayed for the deemed unacceptable period, i.e., the I/O delay period, then a reset request will be sent to the adaptor 4b including the target adaptor 4b under the assumption that the problems in the system 2b including the target adaptor 4b are affecting the target adaptor's 4b ability to communicate on the loop 6. In cases where the device driver 22a, 22b cannot communicate with the target adaptor, i.e., cannot obtain the ID of the target at blocks 116-120, then the device driver 22a will continue to attempt to obtain the target adaptor 4b ID by resending the get ID request until either the identifier is received so that a reset request can be transmitted at block 120 or the window timeout timer expires at block 104 indicating that the system 4b housing the detected adaptor 4b with the communication problem has had sufficient time to initiate and complete an error recovery procedure.

The logic of FIG. 3 thus provides a greater degree of intelligent monitoring in cases where there is a problem in the system including one adaptor that will eventually result in a reset after a period of time that is longer than an acceptable I/O delay time given the availability requirements of the system. With the described implementations, unacceptable I/O delays are not experienced while waiting for the system or I/O bay including the other adaptor to reset. The described implementations are particularly suited for situations where the detected problem between the target adaptor 4b and system 2b including the adaptor is not likely to prevent I/O requests at other adaptors from completing. The logic of FIG. 3 would allow one adaptor to continue processing I/O requests and wait for the detected adaptor to internally reset without having to interrupt I/O processing.

Figure 4A:
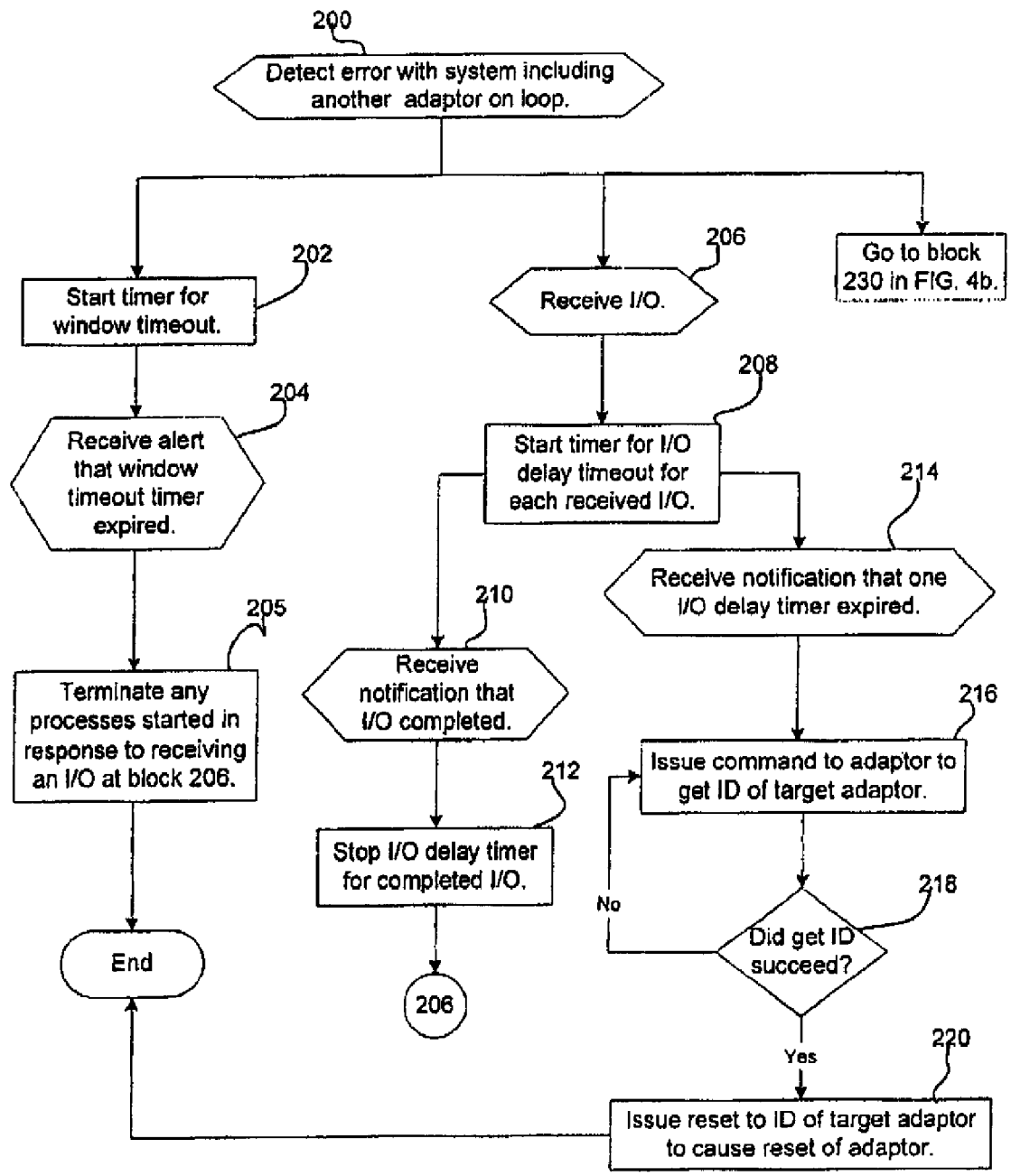
FIGS. 4a and 4b illustrate additional logic implemented when detecting a problem in the system housing another adaptor in accordance with implementations of the invention.
Figure 4B:
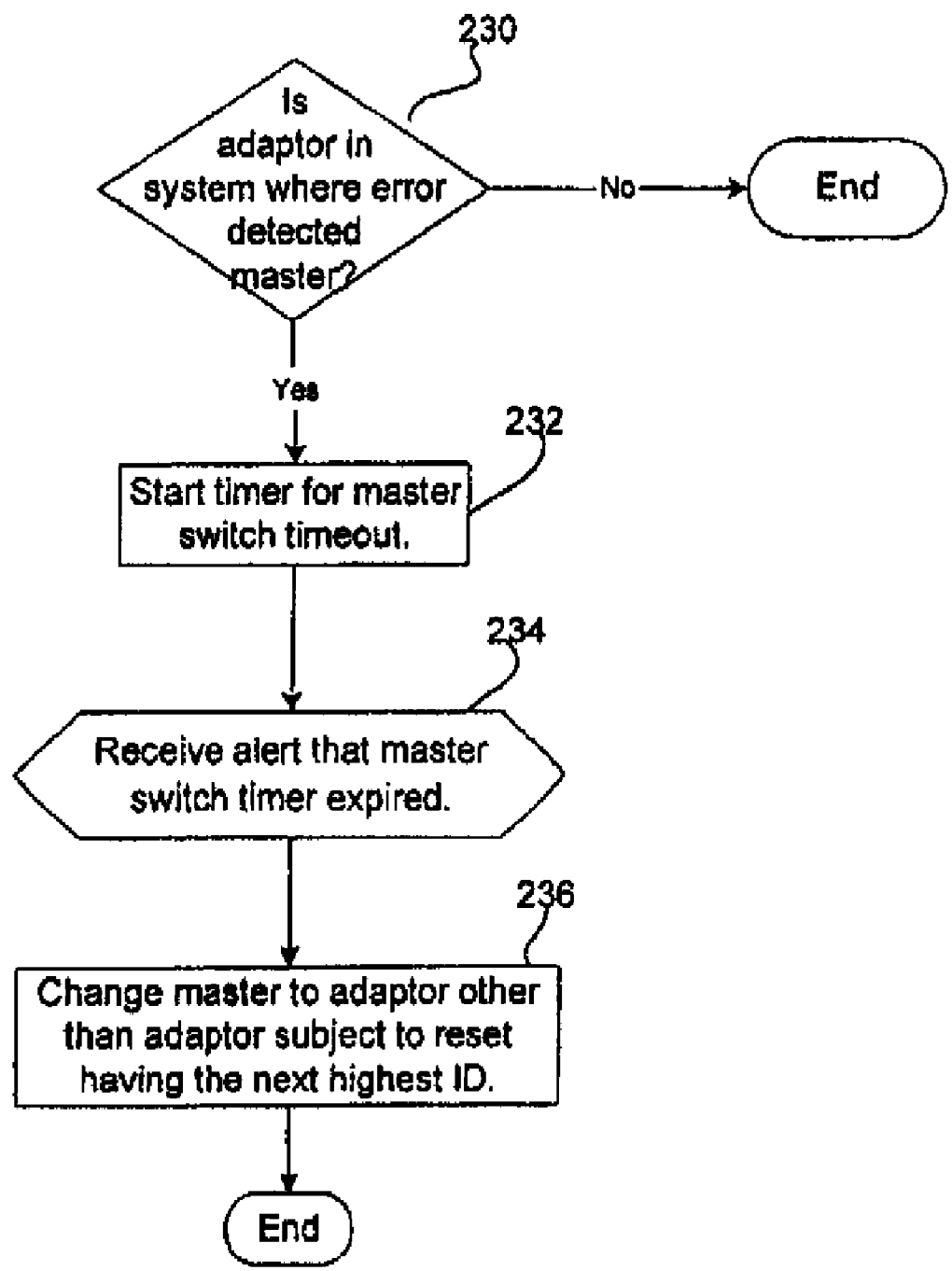

FIGS. 4a and 4b illustrate logic implemented in the device drivers 22a and 22b to account for the fact that the adaptor 4a, 4b in the system where the communication error is detected includes the master adaptor for the loop 6. The logic of FIGS. 4a and 4b provides for a modification of the logic of FIG. 3 to reduce any delays associated with switching the master if the master adaptor is in the target adaptor that will be subject to reset. The steps at block 200, 202, 204, 205, 206, 208, 210, 212, and 214 are identical to the steps performed at blocks 100, 102, 104, 105, 106, 108, 110, 112, and 114 in FIG. 3. The logic diverges in FIGS. 4a and 4b to provide for switching the master if necessary to avoid any delays in altering the master configuration. Upon receiving notification that an I/O timer expired (at block 214), the device driver 22a performs the steps at blocks 216, 218, and 220 (which are identical to steps 116, 118, and 120 in FIG. 3) to issue the command to do the reset of the system/I/O bay where the error was detected. As discussed, the reset may comprise a reset of the adaptor 4b only, or in additional implementations a power cycle command for the system 2 or power boundary including the target adaptor 4b.

Upon detecting the error at block 200, and concurrently with starting the window timeout timer (at block 202) and monitoring for received I/O requests (at block 206), an additional process is initiated at block 230 (FIGS. 4a and 4b). With respect to FIG. 4b, if (at block 230) the adaptor 4b (housed in the system 2b where the error was detected) is the master, then a timer is started (at block 232) for a master switch timeout period. The master switch timeout period is a timeout period selected to change the master in a manner that avoids any master switching delays should the target adaptor 4b in the system where the error was detected be reset. In certain implementations, the master switch timeout period is set to a value less than the window timeout timer and the I/O delay timeout to ensure that the master is switched before the reset occurs following the I/O timer or window timer expiring, so that the resetting process will not be further delayed by having to wait for a switch of the master to another adaptor when the target adaptor 4*b* goes offline during the reset period. In this way, any I/O processing delays due to a master switch operation are avoided.

In implementations where the I/O delay timeout is greater than the master switch timeout period, by the time the I/O delay timer expires, the master switch timer would have expired and triggered a change of master operation at block 230, 232, 234, and 236 if the target adaptor 4*b* subject to the reset is the master. Otherwise, if the I/O delay timer is not greater than the master switch timer, then the reset process initiated in response to the I/O delay timer expiring at block 214 would further reset the master as part of the reset process.

Upon receiving (at block 234) an alert that the master switch timer expired, the device driver 22*a* issues (at block 236) a command to change the master to an adaptor having a next highest unique identifier (ID) port, e.g., adaptor 4*a*, other than the adaptor 4*b* subject to the reset. After block 236, the process started at block 230 to switch the master ends. However, the process to monitor for any I/O requests and the process waiting for the window timeout timer would remain pending to perform any further steps according to the logic described in FIG. 4*a*.

The logic of FIGS. 4*a* and 4*b* provides additional checking over the logic of FIG. 3 to avoid any delays incurred when changing the mastership of the loop 6 from the target adaptor 4*b* being reset to another adaptor on the loop 6. In such case, the described implementations provide a master switch timeout period to ensure that the mastership of the loop 6 is switched before the target adaptor 4*b* is subject to a reset command to avoid any I/O delays related to switching the mastership on the loop 6.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the monitoring logic was implemented in the adaptor device driver, which is an operating system program. Alternatively, the monitoring logic of FIG. 3 may be implemented within the adaptor hardware.

In the described implementations, the detected error condition which triggered the logic of FIG. 3 indicated a problem in the system or I/O bay including the adaptor, where the adaptor itself is functioning properly. However, the logic of FIG. 3 may be initiated in response to other errors, such as internal adaptor hardware errors, line fault errors, ACK time out error in not receiving the required acknowledgment from the target adaptor, loss of synchronization error, code violation error in decoding a character that is not data or is a special character, protocol error, sequence error, frame reject error, etc. Further details of the errors that may trigger the error recovery logic of FIG. 3 are described in the publication "Serial Storage Architecture—Transport Layer 2 (SSA-TL2)", Revision 5b, Working Draft T10.1/1147D (ANSI, Apr. 4, 1997), which publication is incorporated herein by reference in its entirety.

In the described implementations, the reset sent by the device drivers 22*a* and 22*b* is a reset to the adaptor and not other components in the system housing the adaptor. In alternative implementations, the reset may cause a reset or power cycle of the entire system housing the adaptor. In implementations where the system including the adaptor where the error is detected includes multiple power boundaries, i.e., multiple I/O bays, then the reset may cause a power cycle to the specific power boundary, i.e., I/O bay, including the target adaptor 4*b* where the problem is detected. Such a power boundary specific reset would not affect other system components, such as other adaptors, on other power boundaries, such as other I/O bays.

In the described implementations, the storage devices and adaptors are all connected on a loop topology, using a loop protocol such as SSA, the Fibre Channel arbitrated loop protocol, etc. In alternative implementations, the two adaptors may be connected to the storage devices in a non-loop topology. In the topology shown in FIG. 1, each adaptor may directly communicate with any of the storage devices 8*a*, 8*b* . . . 8*j*. In additional implementations, one adaptor may have to communicate through another adaptor to reach a target storage device.

In certain implementations, the disk drives 8*a*, 8*b* . . . 8*j* comprised magnetic hard disk drives. In alternative implementations, the storage devices 8*a*, 8*b* . . . 8*j* may comprise any storage device known in the art, such as optical disks, tapes, etc.

The preferred logic of FIGS. 3, 4*a*, and 4*b* describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for processing Input/Output (I/O) requests to a storage network including at least one storage device and a system including a first adaptor capable of communicating I/O requests to at least one storage device, wherein the system including the first adaptor initiates an error recovery procedure after a system timeout period has expired, comprising:

a second adaptor capable of communicating on the storage network;

means for detecting an error in the system including the first adaptor, wherein the first adaptor is capable of communicating on the storage network after the error is detected, and wherein the detected error indicates that the first adaptor is unable to communicate to the system including the first adaptor;

means for determining whether the first adaptor is designated a master of the storage network after the error is detected;

means for starting a master switch timer, after detecting the error, that is less than the system timeout period if the first adaptor is the master; and means for initiating an operation to designate the second adaptor in the storage network as the master if the first adaptor is the master in response to detecting an expiration of the master switch timer.

2. The system of claim 1, further comprising:

means for sending a reset request to the first adaptor after the master switch timer expires.

3. The system of claim 2, wherein the reset causes a power cycle of the system including the first adaptor.

4. The system of claim 1, wherein I/O requests continue to be processed through the second adaptor until a reset request is sent.

5. The system of claim 1, wherein the storage network on which the adaptors and storage devices communicate comprises a loop topology.

6. The system of claim 5, wherein the adaptors and storage devices communicate using the Serial Storage Architecture (SSA) protocol.

7. A system for processing Input/Output (I/O) requests to a storage network including at least one storage device and a system including a first adaptor capable of communicating I/O requests to at least one storage device, wherein the system including the first adaptor initiates an error recovery procedure after a system timeout period has expired, comprising:

a second adaptor capable of communicating on the storage network;

means for detecting an error in the system including the first adaptor, wherein the first adaptor is capable of communicating on the storage network after the error is detected;

means for determining whether the first adaptor is designated a master of the storage network after the error is detected;

means for starting a master switch timer, after detecting the error, that is less than the system timeout period if the first adaptor is the master; and means for initiating an operation to designate the second adaptor in the storage network as the master if the first adaptor is the master in response to detecting an expiration of the master switch timer, wherein the system including the first adaptor is a separate system accessible over the storage network.

8. A system for processing Input/Output (I/O) requests to a storage network including at least one storage device and a system including a first adaptor capable of communicating I/O requests to at least one storage device, wherein the system including the first adaptor initiates an error recovery procedure after a system timeout period has expired, comprising:

a second adaptor capable of communicating on the storage network;

means for detecting an error in the system including the first adaptor, wherein the first adaptor is capable of communicating on the storage network after the error is detected;

means for determining whether the first adaptor is designated a master of the storage network after the error is detected;

means for starting a master switch timer, after detecting the error, that is less than the system timeout period if the first adaptor is the master; and means for initiating an operation to designate the second adaptor in the storage network as the master if the first adaptor is the master in response to detecting an expiration of the master switch timer, wherein the first adaptor is within the system including the second adaptor, and wherein a reset request causes a reset of the first adaptor.

9. A computer readable medium including code for processing Input/Output (I/O) requests to a storage network including at least one storage device and at least two adaptors, wherein each adaptor is capable of communicating I/O requests to at least one storage device, wherein the code when executed by a processor causes operations, the operations comprising:

detecting an error in a system including a first adaptor, wherein the first adaptor is capable of communicating on the storage network after the error is detected;

determining whether the first adaptor is designated a master of the storage network after the error is detected;

starting a master switch timer that is less than a system timeout period if the first adaptor is the master after detecting the error, wherein an error recovery procedure in the system including the first adaptor is initiated after the system timeout period has expired;

initiating an operation to designate a second adaptor in the storage network as the master if the first adaptor is the master in response to detecting an expiration of the master switch timer;

initiating a monitoring state to monitor I/O requests transmitted through the second adaptor in response to detecting the error;

starting an I/O delay timer that is less than the system timeout period in response to receiving an I/O request; and sending a reset request to the first adaptor in response to detecting an expiration of one staffed I/O delay timer.

10. A computer readable medium including code for processing Input/Output (I/O) requests to a storage network including at least one storage device and at least two adaptors, wherein each adaptor is capable of communicating I/O requests to at least one storage device, wherein the code when executed by a processor causes operations, the operations comprising:

detecting an error in a system including a first adaptor, wherein the first adaptor is capable of communicating on the storage network after the error is detected, wherein the detected error indicates that the first adaptor is unable to communicate to the system including the first adaptor;

determining whether the first adaptor is designated a master of the storage network after the error is detected;

starting a master switch timer that is less than a system timeout period if the first adaptor is the master after detecting the error, wherein an error recovery procedure in the system including the first adaptor is initiated after the system timeout period has expired; and initiating an operation to designate a second adaptor in the storage network as the master if the first adaptor is the master in response to detecting an expiration of the master switch timer.

11. A computer readable medium including code for processing Input/Output (I/O) requests to a storage network including at least one storage device and at least two adaptors, wherein each adaptor is capable of communicating I/O requests to at least one storage device, wherein the code when executed by a processor causes operations, the operations comprising:

detecting an error in a system including a first adaptor, wherein the first adaptor is capable of communicating on the storage network after the error is detected;

determining whether the first adaptor is designated a master of the storage network after the error is detected;

starting a master switch timer that is less than a system timeout period if the first adaptor is the master after detecting the error, wherein an error recovery procedure in the system including the first adaptor is initiated after the system timeout period has expired; and initiating an operation to designate a second adaptor in the storage network as the master if the first adaptor is the master in response to detecting an expiration of the master switch timer, wherein the system including the first adaptor is a first system, wherein a device driver and an operating system are in a second system.

* * * * *